US005312154A

United States Patent [19]

Woodall

[11] Patent Number: 5,312,154

[45] Date of Patent: May 17, 1994

[54] APPARATUS FOR HOLDING DOWN WORKPIECES TO BE MACHINED

[76] Inventor: Darrel Woodall, 1260 N. La Loma Cir., Anaheim, Calif. 92806

[21] Appl. No.: 11,950

[22] Filed: Feb. 1, 1993

[51] Int. Cl.[5] .......... B23Q 3/02

[52] U.S. Cl. .......... 269/93

[58] Field of Search .......... 254/91-94, 254/99, 100, 900

[56] References Cited

U.S. PATENT DOCUMENTS 1,820,667 8/1931 Leyes .
1,849,214 3/1932 Zuanich .
1,982,488 11/1934 Weber .
2,560,525 7/1951 Nyl .
2,888,052 5/1959 Reason .......... 269/91
4,058,885 11/1977 Bergman .
4,174,828 11/1979 Bergman .

FOREIGN PATENT DOCUMENTS 50-81424 1/1977 Japan .......... 269/91

*Primary Examiner*—Robert C. Watson
*Attorney, Agent, or Firm*—Richard L. Gausewitz

[57] ABSTRACT

An apparatus for holding down workpieces in milling machines and other machine tools. A hollow receptacle has undercut regions that receive lugs on the lower end of a stud. The stud thereby connects to the receptacle, and disconnects from it, by being turned only a fraction of a turn. A nut on the stud is friction related to it by an adjustable friction generator. The receptacle, nut and stud cooperate with a strap clamp and heel block, to very quickly and easily mount and demount parts in milling and other machines.

16 Claims, 2 Drawing Sheets

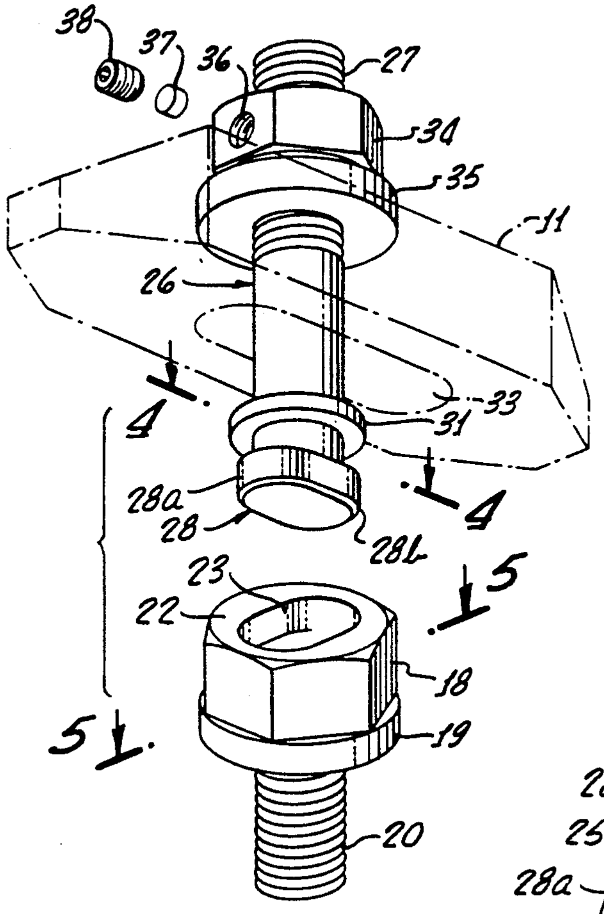
FIG. 3.
FIG. 4.
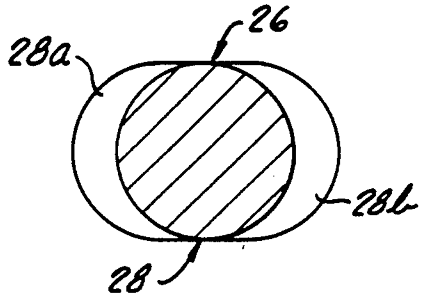
FIG. 5.
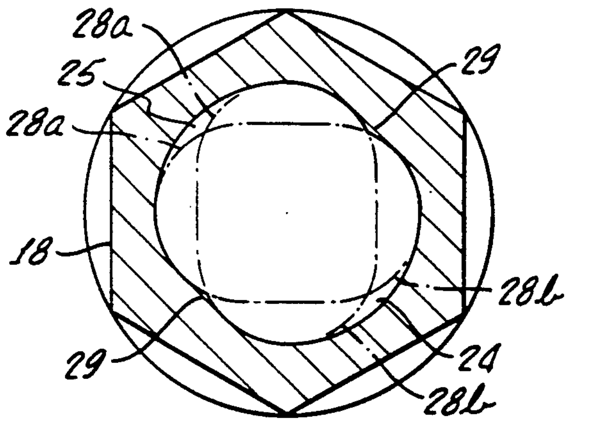

APPARATUS FOR HOLDING DOWN WORKPIECES TO BE MACHINED

BACKGROUND OF THE INVENTION

For high-volume (for example, many thousands) production of metal parts (workpieces) on milling machines and other machine tools, it can be practical to employ expensive quick-acting apparatus to hold down the workpieces that are being machined. Such apparatus is typically hydraulic. At the other end of the scale, when only a few metal parts are to be milled or otherwise machined, it is practical to use ordinary bolts and nuts to hold down the workpieces.

However, it is common for small production runs to occur. For example, a few hundreds or thousands of parts may be made identical to each other, as distinguished from the many thousands that would justify expensive quick-acting hydraulic hold-down apparatus. In production runs of this type, speed in changing from one part to the other is of paramount importance. Further, even during machining of the same part, it is frequently necessary to change the position of the hold-down apparatus in order for the entire machining of such part to be completed.

It is emphasized that when no workpiece is present, the hold-down apparatus should occupy as little space as possible—should not get in the way. However, it is also important in a production run that the hold-down apparatus will stay in the same place for part after part without any necessity for measuring, adjustment or positioning work by the machinist or operator.

In addition to the above, the cost of the hold-down apparatus is of distinct significance. If the hold-down apparatus is not relatively inexpensive, as well as being simple, easy and fast to operate, it will probably not achieve commercial success. It is pointed out that some workpieces require a substantial number of hold-down elements, this being another factor relative to the overall cost to the machine shop or manufacturer.

A further important factor is that the hold-down apparatus should not be such as to become clogged by chips and granules that fly off the workpiece during machining, cutting and other operations. It is not desired that the operator be required to stop production and blow out granules, etc., at frequent intervals.

Another factor to be taken into account is tolerances relative to the thickness of the part being manufactured. It should be understood that the workpieces will vary slightly in thickness from part to part.

SUMMARY OF THE INVENTION

One element of the present combination comprises a receptacle which performs functions including that of anchor, and locator, and stop. The receptacle is small in size, simple in construction, and does not normally hinder changes of workpieces, or changes of the position of a particular workpiece.

A second element of the combination is a stud having a lug at one end thereof adapted to fit into the receptacle and rotate therein through a fraction of a turn. In accordance with one aspect of the invention, the stud incorporates a debris shield that nests near the receptacle during machining and prevents chips, granules, etc., from entering the receptacle cavity.

A third element of the invention comprises a nut that threads onto the stud and seats on (for example) a conventional strap clamp that is bridged between the workpiece and a support element. In accordance with an aspect of the invention, means are provided to create substantial friction between the nut and the stud, thereby automatically effecting rotation of the stud, between locking and unlocking positions relative to the receptacles, as the nut turns.

In accordance with the method, friction is employed to effect rotation of the stud with the nut, and a small amount of excess rotation is performed in order to provide sufficient clearance to make the hold-down apparatus ready for the next workpiece despite tolerance variations in workpiece thickness.

BRIEF DESCRIPTION OF THE DRAWINGS

FIG. 3 is an exploded view showing in full lines the parts of the combination manufactured by the present inventor, the conventional strap clamp being shown in phantom lines;

FIG. 4 is an enlarged horizontal sectional view on line 4—4 of FIG. 3; and FIG. 5 is an enlarged horizontal sectional view on line 5—5 of FIG. 3.

DETAILED DESCRIPTION OF THE PREFERRED EMBODIMENT

Figure 1:
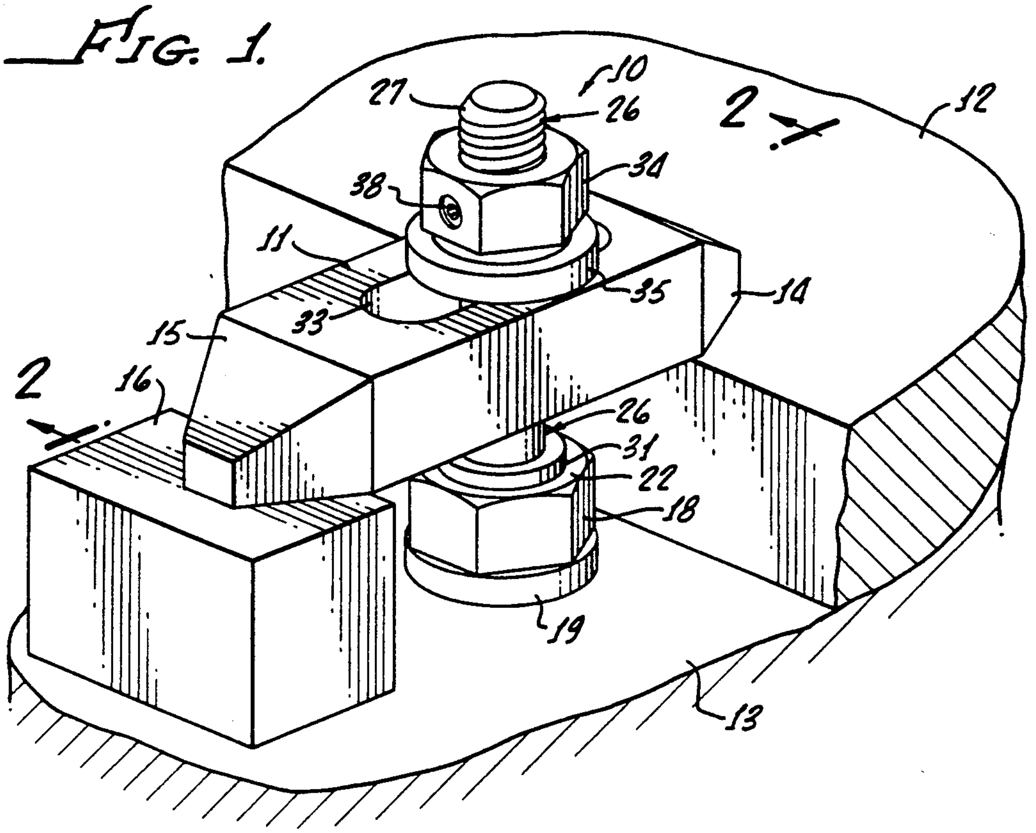
FIG. 1 is an isometric view showing the present workpiece-holding combination in its condition at which it holds on a worktable or fixture the edge of a workpiece to be milled or otherwise machined.
Figure 2:
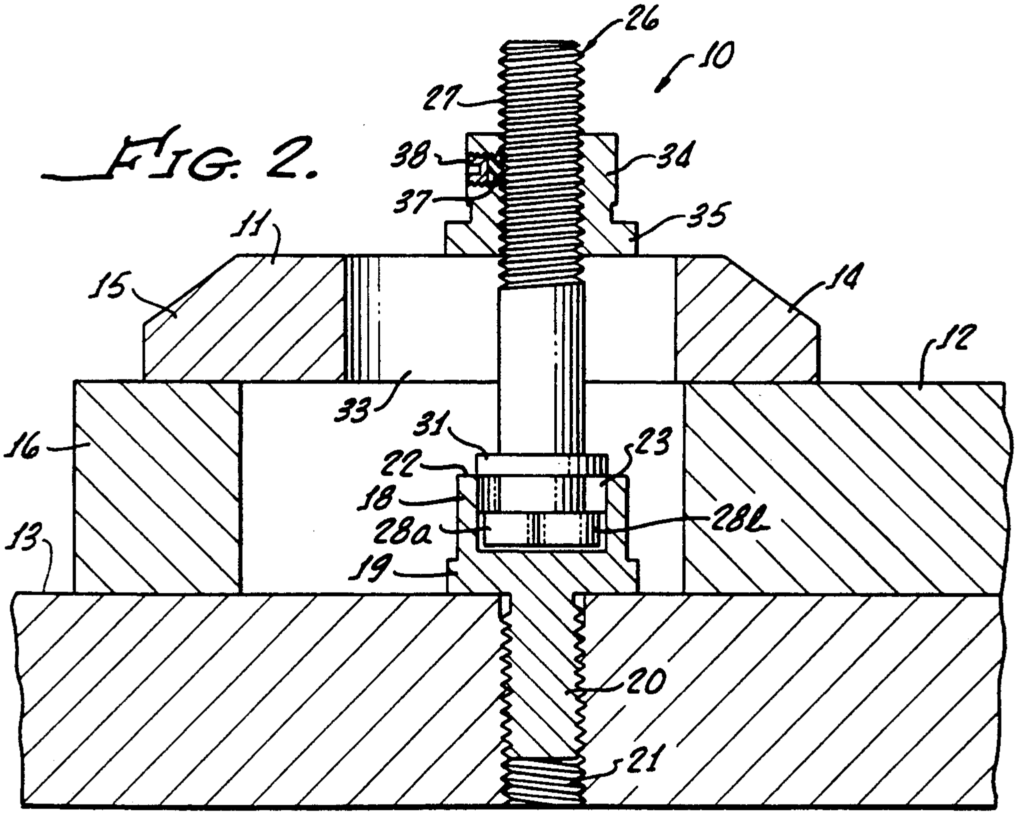
FIG. 2 is a view, primarily in vertical section, generally along line 2—2 of FIG. 1.

Referring first to FIGS. 1 and 2, the present workholder or hold-down apparatus is indicated generally at 10, and is shown as holding down a strap clamp 11 and thus a workpiece (part) 12. Workpiece 12 is shown as being a plate of metal, plastic, etc.—it being understood that the workpiece may have a very wide variety of sizes and shapes. A milling machine or other machine tool, not shown, is associated with the workpiece 12 to perform a milling or other operation relative thereto. Work 12 is shown as resting on a steel plate 13 which may be a worktable, or a plate or fixture bolted to a worktable.

The strap clamp 11 is an elongate rectangular bar having a toe end 14 that seats on the workpiece 12 (or, alternatively, on a small sheet or plate that rests on the workpiece), and a heel end 15 that rests on a suitable support which is in turn supported on plate 13. Preferably, the heel end 15 is caused to be slightly higher than the toe end 14. It is pointed out that heel end 15 may be supported at the indicated elevation in numerous ways, for example by resting on the illustrated block 16 having the indicated thickness. As one alternative, not shown, two triangular step blocks each having a zigzag face may be meshed with each other so as to overlap to the desired extent. These blocks are held in close interlocking relationship by a C-clamp—heel end 15 then resting on the upper block while the lower block rests on plate 13.

The ends 14, 15 are each shown as being tapered to a relatively blunt point so that a minimum of the surface area of workpiece 12 will be engaged by whichever end the strap clamp is being utilized for a particular part, the strap clamp being reversible so that either end may be used.

Proceeding next to a description to the receptacle portion of workholder 10, this is a hollow hex head 18 having at the lower portion thereof a circular flange 19 the horizontal undersurface of which rests upon the horizontal upper surface of plate 13. Head 18 (the body of the receptacle) is anchored in position on plate 13 by a coaxial threaded connector 20 (FIG. 2) that is integral with the head. Connector 20 is threaded into a drilled and counterdrilled bore 21 in plate 13. This is caused to be a very strong threaded connection, by torquing with large force and/or by use of a suitable adhesive so as to prevent rotation of the connector 20 in its bore 21.

Referring especially to FIGS. 2, 3 and 5, the hex head or body 18 of the receptacle is (by hollowing or suitable cold-forming) hollowed out in a certain way. The "hollowing" is such that there is a horizontal upper wall 22 having an elongate opening 23 therein, the ends of the opening 23 being preferably generally semi-cylindrical as shown in FIG. 3. The center of opening 23 is at the axis of the hex head 18.

The upper wall 22 of hex head 18 is not undercut at regions adjacent the ends of opening 23. Thus, the end walls of the cavity within the hex head are smooth all the way to the top surface of the hex head. On the other hand, the cavity is hollowed out or undercut beneath the side walls of opening 23, to form undercut regions 24,25 that are shown in FIG. 5. Such regions are adapted to cooperate with lugs at the end of the stud next described. Such regions have top walls that are horizontal.

As best shown in FIG. 3, the stud is numbered 26, has a threaded upper portion 27, and has a transverse lug 28 at the lower end thereof. The sides of lug 28 are tangential, as shown in FIG. 4, to the unthreaded lower portion of stud 26. The ends of lug 28 are indicated at **28*a*,28*b* and extend in diametrically opposite directions relative to each other. Such ends are rounded (substantially semi-cylindrical) so that the lug 28 will fit easily through opening 23. When the horizontal bottom surface of lug 28 rests on or is near the bottom wall of the cavity within hex head 18, the upper surfaces of lug ends 28*a*,28*b* are at elevations lower than those of the lower surfaces of upper wall 22 at undercut regions 24, 25**.

The shapes of regions 24,25 are such that stud 26 and lug 28 may be rotated clockwise (as viewed from above) and thereafter counterclockwise through approximately 90° but no further. Thus, as shown in FIG. 5, there are stop regions 29 of the hex head that are engaged by lug ends **28*a*,28*b* after the substantially 90° rotation has occurred, and which prevent any further rotation. The phantom-line showing in FIG. 5** show the preferred extreme rotated positions of the lug.

The clearances are such that the lug ends of the studs may be easily manually inserted into the receptacles and easily manually rotated in therein in either direction. On the other hand, the clearances are not so large that the studs are not constrained against substantial tilting after the lugs have been rotated clockwise into the undercuts. Preferably, the studs may tilt a few degrees from the vertical, in any direction, when the lugs are fully in the undercuts.

In addition to its threaded portion and its lug, stud 26 comprises a debris shield 31. This is illustrated to be a circular flange having a diameter sufficiently large to fit over substantially the entire opening 23 (FIGS. 2 and 3) so that no substantial chips, granules or other debris can enter the cavity in the hex head. The debris shield 31 is so positioned on the stud that its seats on (or is near) the upper surface of head 18 when lug 28 (**28*a* and 28*b***) is in fully inserted position.

Debris shield 31 performs the further function of preventing unintended disassembly of the stud 26 from strap clamp 11. Thus, flange 31 has a diameter larger than the width of the elongate longitudinal slot 33 in the strap clamp. Because the strap clamp 11 and associated stud 26 are removed each time the workpiece 12 is replaced or moved, the maintaining of the stud assembly in combination with the strap clamp 11 is a beneficial factor.

Proceeding next to a description of the nut, this is a hex nut 34 the lower portion of which is integral with a circular flange 35 that seats on the upper surface of strap clamp 11, it being understood that the slot 33 is only sufficiently wide to loosely receive stud 26. Friction is created between nut 34 and the threaded portion 27 of the stud, for example by providing an internally threaded radial bore 36 (FIG. 3) in the nut. Such bore receives a nylon plug 37 that is held in position by a set screw 38 which is threaded into the bore. The latter is tightened from time to time in order to maintain a substantial but not excessive amount of friction between the nut assembly and the stud 26.

It is to be understood that studs 26 are provided in different lengths, so as to accommodate workpieces 12 having different thicknesses.

METHOD OF THE INVENTION

Let it be assumed, for example, that there is to be a relatively small production run (e.g. five hundred parts) on a milling machine. A plate 13 is provided and is drilled and tapped to provide several bores 21 at locations close to and outwardly of where the edges of workpiece 12 will be when the workpiece is seated on the plate. One such close orientation is illustrated in FIGS. 1 and 2. By having the workholders close to the workpiece, there is more strength and rigidity than if there were large spaces there between.

Then, a receptacle is mounted at each of the bores 21. This is done by threading a connector 20 into each bore 21 until the flange 19 seats on the upper surface of plate 13. As above stated, this is caused to be a connection which greatly resists rotation. Thus, the hex head 18 is torqued very strongly by a large wrench or power wrench to tightly mounted condition, and/or a suitable adhesive is employed to prevent or resist reverse rotation.

Thereafter, studs 26 are selected that have lengths much longer than the thickness of workpiece 12. Furthermore, the workpiece 12 is mounted in position, within the receptacles.

The next step comprises manually inserting the lower (lug) end of each stud 26 into a fixed receptacle, namely through the elongate opening 23 (FIG. 3) that is sized and shaped to receive the lugs **28*a*,28*b*. The insertion is as far as permitted by the receptacle, preferably until debris flange 31 engages the upper wall 22**.

Each stud is then manually turned one-quarter turn clockwise (as viewed from above), which rotates the lugs **28*a*,28*b* from the positions shown at left and right in FIG. 5 to the ones shown at top and bottom therein. Stated otherwise, each stud is manually rotated clockwise as far as it will go, namely as far as permitted by the stop regions 29 (FIG. 5**). The studs are thus held quite firmly in upward-extending conditions, as above stated.

A heel block 16 having a thickness slightly greater than that of workpiece 12 is then disposed adjacent each hex head 18 in outwardly-spaced relationship therefrom, as shown in FIGS. 1 and 2. (Alternatively, adjustable heel-supporting means may be employed as described above.) As the next step, a strap clamp 11 is mounted over each upwardly-projecting stud 26, with the stud extending upwardly through an associated slot 33. Each strap clamp bridges between the workpiece and a heel block.

As the next step, a hex nut 34 is threaded onto the threaded upper portion 27 of each stud, and is turned clockwise until flange 35 seats on the upper surface of its associated strap clamp. Each nut is torqued clockwise to the desired degree of holding force, by means of a wrench. Such torquing does not cause the stud to move substantially upwardly, because the upper surfaces of lugs 28*a*,28*b* engage the horizontal upper walls of undercut regions 24,25 of the receptacle.

The initial securing of the workpiece 12 in position having thus occurred, many identical parts may be mounted for machining purposes with minimal time or effort.

For example, after the initial workpiece is machined, the machinist or operator uses a wrench to unscrew the nut 34 until it is free. Stated otherwise, the nut is unscrewed just until the machinist feels a sudden lessening of resistance to reverse torquing. Thereafter, reverse torquing is continued in the same direction for approximately one-quarter turn. There is little or no resistance to this latter turning because at this time the lugs 28*a*,28*b* are moving from the position shown "vertical" in FIG. 5 to the one shown "horizontal" therein (it being understood that the lugs are not actually vertical at any time, in the illustrated embodiment, and that this nomenclature is used merely for purposes of convenience).

After the lugs have turned counterclockwise to the "horizontal" position of FIG. 5, they are not able to turn any further because they engage the side wall of the receptacle cavity at the regions 29. The operator then suddenly feels resistance, because further counterclockwise torquing cannot occur without the hex nuts 34 turning relative to its associated threaded portions 27. Such latter turning is resisted by the nylon elements 37, the degree of resistance being determined by the degree of tightening of set screws 37.

The preferred embodiment of the method comprises continuing the counterclockwise turning for an additional one-quarter turn, so as to back off each hex nut 34 one-quarter turn away from the position where it was when the lugs 28*a*,28*b*—and thus the stud 26—were stopped from turning by the stop regions 29. This backing-off creates a small clearance which assures that (in the vast majority of cases) the next workpiece 12 to be machined will not prevent insertion of the lugs 28*a*,28*b* to a depth sufficiently deep in the cavity (in hex head 18) that the locking operation may be repeated. In other words, it is assured that there is sufficient clearance that the lugs 28*a*,28*b* can enter the cavity sufficiently far that they will turn into the undercut regions 24,25 when the stud is torqued for the next workpiece.

As the next step in the method, each combined strap clamp 11, stud 26, and nut 34 is lifted away from the workpiece 12 and deposited in some convenient place such as on plate 13 outwardly of a receptacle. It is pointed out that the stud, etc., necessarily remains assembled with the strap clamp 11 because flange 31 prevents the lugs 28*a*,28*b* from passing through slot 33.

The first workpiece 12 is then removed, and a second workpiece is placed on the plate 13 in the same orientation as that of the first workpiece. For each receptacle (hex head 18), the operator takes an assembled stud, nut and strap clamp, and positions the clamp 35 in bridged relationship between heel block 16 and the workpiece 12—at the same time manually causing the lugs 28*a*,28*b* to pass through opening 23 (FIG. 3). Each stud is then manually turned one-quarter turn, causing the stop regions 29 to be engaged as shown in the "vertical" position in FIG. 5, following which a wrench is employed to torque the nut 34 to the desired clamping force.

The second part is then machined, and the process is repeated for the remaining (for example) 498 parts.

Once the initial set-up has been completed, the clamping and unclamping of each workpiece occur much faster than the time required to describe it. It is the belief of the inventor that, in comparison to clamping by means of a conventional stud and associated strap clamp, the present invention saves approximately 30 seconds per clamp. At (for example) three clamps per workpiece, the present invention would save over 700 minutes for machining the 500 parts.

The following is a typical instruction to a machinist or other operator, after the time when the first part has been mounted and machined:

A. Unscrew the nut until it is free, then continue loosening ¼ turn (you will feel a small resistance) to get some clearance for reinstallation.

B. Lift the clamp/nut/stud assembly out of the receptacle.

For clamp replacement:

A. Place the clamp/nut/stud assembly on the part and heel block. Insert the stud in the receptacle, and turn ¼ turn by hand.

B. Torque the nut down to the desired clamping force.

Of course, during the machining operation there will be many chips and granules generated. These are prevented from entering the hollow head 18 by the flange (debris shield) over surface 22.

It is pointed that for some workpieces the hold-down clamps need to be moved while the workpieces are machined. For example, part of a workpiece may be cut away, following which it is necessary to cut away a part that was previously engaged by one or more of the present strap clamps. With the present apparatus and method, the workpiece may be released repeatedly, following which the workpiece may be held down by a clamp located at a different place.

The present apparatus may also be employed where only a few parts are to be machined, although that is not its prime function. In such situations, the connector 20 portion of the receptacle may be (for example) secured in a Tee Nut in the worktable.

The above description is written on the assumption that the thread on the stud is right-hand. The word "manual" denotes by hand-without a wrench.

The combination receptacle and lugs are the best mode of a quick-connect coupler means that locks and unlocks (couples and uncouples) in less than one turn.

The foregoing detailed description is to be clearly understood as given by way of illustration and example only, the spirit and scope of this invention being limited solely by the appended claims.

What is claimed is:

1. Apparatus for holding down a workpiece on a workpiece support, comprising:
- a connector adapted to be connected to a workpiece support,
  - said connector having one component of a quick-connect coupling element,
- a stud having a threaded upper portion,
  - said stud having at the lower end thereof the other component of said quick-connect coupling element,
- a nut threadedly mounted on said threaded upper portion of said stud, and
- a clamp disposed between said nut and said quick-connect coupling element when said one and said other components thereof are in mated condition,
  - said clamp having a portion that seats on a portion of a workpiece when a workpiece is resting on said workpiece support,
    - there being no apparatus associated with said claim portion and which is adapted to vary the pressure on said workpiece portion when said clamp portion is stationary,
  - said nut being adapted to tighten on said clamp, and force said clamp portion into tight pressure engagement with said workpiece portion, in response to turning of said nut when said one and said other components of said quick-connect coupling element are in mated condition.

2. The apparatus as claimed in claim 1, in which said one component and said other component of said quick-connect coupling element are shaped to mate with each other in response to a fraction of a turn of said stud about the longitudinal axis of said stud.

3. The apparatus as claimed in claim 1, in which means are provided to generate such forces, when said nut is rotated in a direction to tighten said nut on said clamp, as to cause said quick-connect coupling element to assume mated condition and to tend to remain in mated condition.

4. The apparatus as claimed in claim 3, in which said means increase the friction between said nut and said threaded upper portion of said stud.

5. The apparatus as claimed in claim 4, in which said means includes means to regulate the amount of said friction.

6. The apparatus as claimed in claim 1, in which a debris shield is provided on said stud and is shaped and disposed to shield said quick-connect coupling element from debris.

7. The apparatus as claimed in claim 1, in which said one component of said quick-connect coupling element is a receptacle, and in which said other component thereof is an element adapted to enter said receptacle and rotate therein about the longitudinal axis of said stud, and in which an externally-threaded connector is connected to the bottom of said receptacle for threading into a threaded hole in said workpiece support.

8. The apparatus as claimed in claim 7, in which a flange is mounted on said stud and shaped and disposed to be over said receptacle and substantially close the same when said other component of said quick-connect coupling element is mated with said receptacle.

9. The apparatus as claimed in claim 7, in which said receptacle has an entrance opening that is elongate in a direction perpendicular to the axis of said connector, and in which said element adapted to enter said receptacle is lug means shaped to fit through said elongate opening, and in which said receptacle has undercut means adapted to receive said lug means when said stud rotates in a predetermined direction relative to said receptacle, and in which means are provided in said receptacle to stop rotation of said lug means when said lug means is in said undercut means, whereby said lug means may not be withdrawn from said receptacle until said stud rotates in the opposite direction to cause said lug means to be out of said undercut means and in registry with said elongate opening.

10. The apparatus as claimed in claim 1, in which said quick-connect coupling element has such clearances as to permit easy manual rotation of the elements thereof between locking and unlocking positions, and also such as to hold said stud substantially vertical when said quick-connect coupling element is in coupled condition.

11. Apparatus for holding down a workpiece on a workpiece support, comprising:
- anchor means adapted to be threadedly connected to a workpiece support,
- a plurality of vertical studs each having a threaded upper end, and each also having a quick-connect portion at its lower end that, after rotation of each stud in a predetermined direction about its vertical axis, for less than one turn, connects such quick-connect portion to said anchor means,
- stop means on said anchor means to stop rotation of each stud in said predetermined direction after less than one turn,
- a plurality of nuts respectively mounted on said threaded upper ends,
  - each of said nuts being adapted to tighten down on an associated clamp upon rotation of said nuts in said predetermined direction after said stop means had been engaged,
- a plurality of work clamps, having said studs respectively passed therethrough and having said nuts respectively seated thereon, and
- means to raise the friction between said nuts and said threaded upper ends of said studs,
  - said last-named means causing said studs to rotate with said nuts in said predetermined direction until said stop means is engaged.

12. The apparatus as claimed in claim 11, in which means are provided to adjust the friction of said friction-raising means.

13. The apparatus as claimed in claim 11, in which second stop means are provided to stop rotation of each stud in the direction opposite to said predetermined direction for less than one turn, whereby when said nuts are rotated in said opposite directions said second stop means are engaged, following which said nuts can back off said clamps when further rotation in said opposite direction occurs.

14. Apparatus for holding down a workpiece on a workpiece support, comprising:
- a connector adapted to be connected to a workpiece support,
  - said connector having one component of a quick-connect coupling element,
- a stud having a threaded upper portion,
  - said stud having at the lower end thereof the other component of said quick-connect coupling element,
- a nut threadedly mounted on said threaded upper portion of said stud, and
- a clamp disposed between said nut and said quick-connect coupling element when said one and said other components thereof are in mated condition;

said clamp being shaped to seat on a workpiece when a workpiece is resting on said workpiece support, said nut being adapted to tighten on said clamp, and force said clamp into tight pressure engagement with said workpiece, in response to turning of said nut when said one and said other components of said quick-connect coupling element are in mated condition, there being no seat associated with said stud on which said clamp seats, whereby downward force on said clamp, created by said nut, is transmitted to said workpiece.

15. The invention as claimed in claim 14, in which said clamp extends in both directions from said stud, and in which a support for said clamp is provided on said workpiece support at the end of said clamp remote from said workpiece.

16. Apparatus for holding down a workpiece on a workpiece support, comprising:

a connector adapted to be connected to a workpiece support, said connector having one component of a quick-connect coupling element, a stud having a threaded upper portion, said stud having at the lower end thereof the other component of said quick-connect coupling element, a nut threadedly mounted on said threaded upper portion of said stud, a clamp disposed between said nut and said quick-connect coupling element when said one and said other components thereof are in mated condition, said clamp being shaped to seat on a workpiece when a workpiece is resting on said workpiece support, said nut being adapted to tighten on said clamp, and force said clamp into tight pressure engagement with said workpiece, in response to turning of said nut when said one and said other components of said quick-connect coupling element are in mated condition, said one component of said quick-connect coupling element being a receptacle adapted to seat on top of said workpiece support, and said other component thereof being an element adapted to enter said receptacle and rotate therein about the longitudinal axis of said stud, and an externally-threaded connector connected to the bottom of said receptacle for threading into a threaded hole in said workpiece support.

* * * * *